Figure 5:
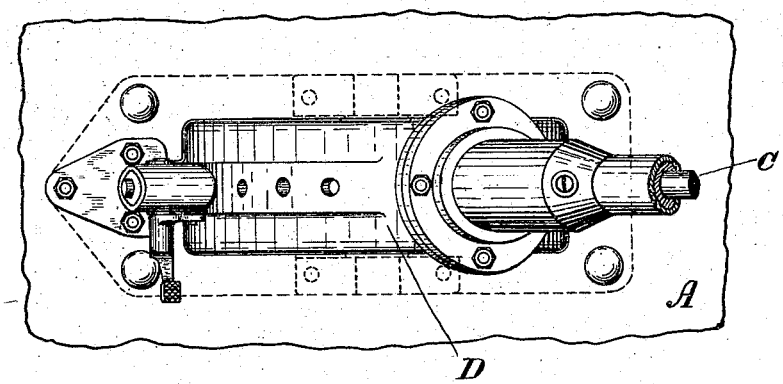

No. 840,660. PATENTED JAN. 8, 1907.
A. L. RIKER.
STEERING MECHANISM FOR VEHICLES.
APPLICATION FILED MAY 15, 1902.
2 SHEETS—SHEET 1.
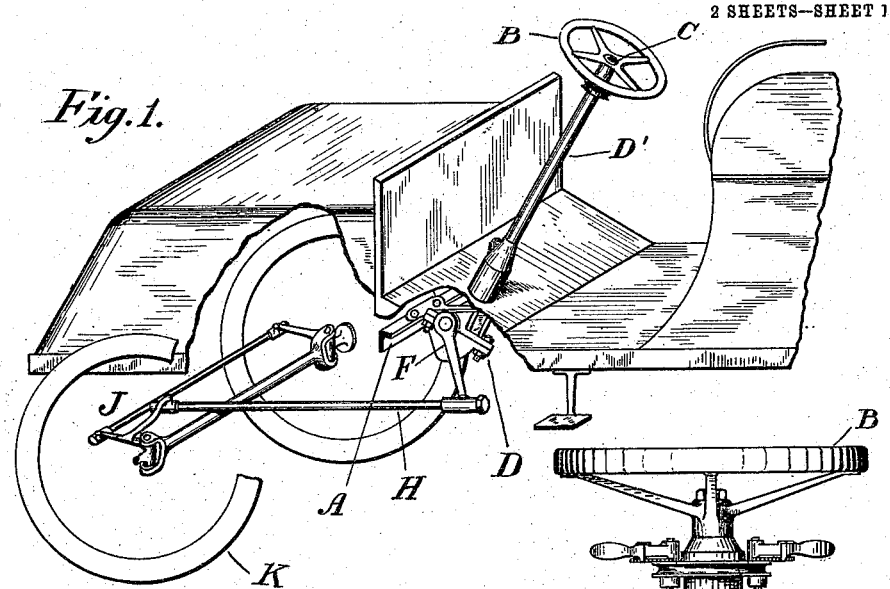
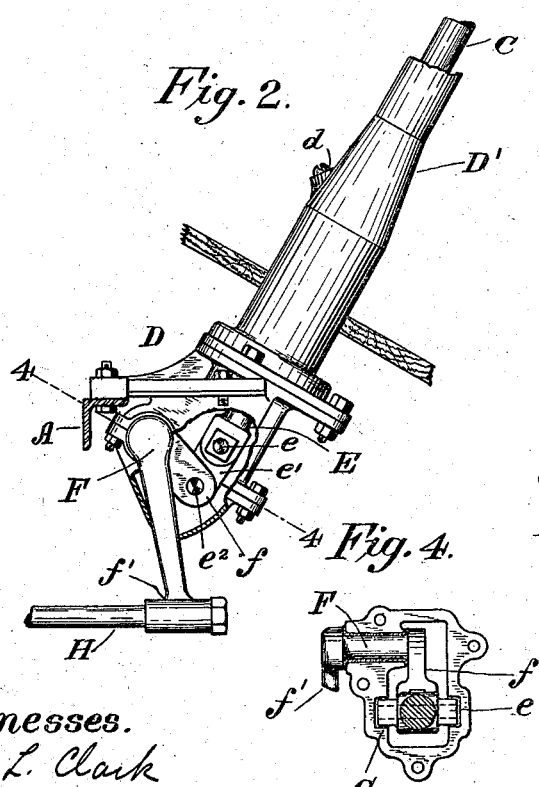
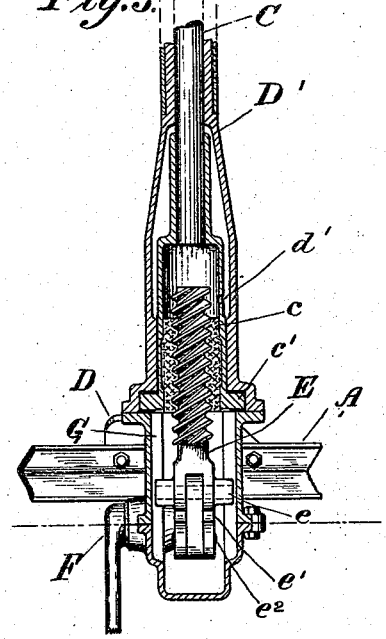
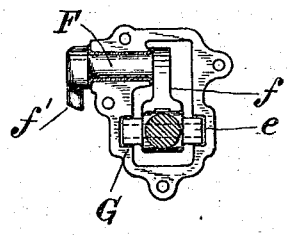
Witnesses.
M. L. Clark
J. E. Coleman
Inventor.
Andrew L. Riker
By Hermann ——
his Att'y

UNITED STATES PATENT OFFICE.

ANDREW L. RIKER, OF SHORT HILLS, NEW JERSEY, ASSIGNOR, BY MESNE ASSIGNMENTS, TO ELECTRIC VEHICLE COMPANY, OF JERSEY CITY, NEW JERSEY, AND HARTFORD, CONNECTICUT, A CORPORATION OF NEW JERSEY.

STEERING MECHANISM FOR VEHICLES.

No. 840,660.     Specification of Letters Patent.     Patented Jan. 8, 1907.

Application filed May 15, 1902. Serial No. 107,438.

*To all whom it may concern:*

Be it known that I, ANDREW L. RIKER, a citizen of the United States, and a resident of Short Hills, in the county of Union and State of New Jersey, have invented certain new and useful Improvements in Steering Mechanism for Vehicles, of which the following is a specification, reference being had to the accompanying drawings, forming a part hereof.

This invention relates to means within the reach of the occupant of a vehicle by which he effects the movements of the parts to deflect the wheels of the vehicle and steer it. For convenience an upright steering-post, either inclined or vertical, is placed in proximity to the seat occupied by the operator of the vehicle, and though frequently this post is turned by a lever it is usual to operate it by means of a wheel at its upper end, while the operation of either means rotates the lower end of the pillar and through the rotation of the pillar moves the connections through either links or bell-cranks or other mechanism suitably disposed or proportioned. In order to connect the lower end of this rotating post or pillar with such mechanism, various means have at times been suggested, in the operation of some of which there are decided defects, impeding the effect of operation or lessening the durability of the structure. It is required that such a connection shall, if possible, transmit the movement without any backlash in case any threaded parts are used and not only when new, but shall be so arranged as to prevent any wear as well as friction of coacting members, which latter would, in addition to its inherent disadvantage, augment the former trouble. It is also necessary that a construction for this purpose shall more or less prevent reaction of any outside tendency to deflect the wheels, but in the reverse should enable the deflection of the wheels through the steering connections to be effected with the least power, rapidity, and facility in every way.

The object of my invention is to accomplish all these results, and to that effect I construct my steering-pillar with a threaded lower portion and a coacting threaded member pivoted approximately in its axis to an operating part of the wheel-turning connections, all of which is more fully described hereinafter, particularly in reference to the drawings forming a part hereof, indicating one form of the embodiment of my invention.

Among other objects of my invention is the combination, with the operating parts at the lower end of the steering-shaft, of a casing entirely inclosing the same and protecting all such parts against dirt and dust, so constructed and arranged whereby there is also permitted most efficient oiling, a most advantageous supporting of parts, as well as other desirable features, also the combination of all or some of the above features in a hinged operating-wheel construction. The former combination has, it might be specifically mentioned, a further object in bringing the bearings of the interengaging parts, which receive opposing thrust, in such relation as to permit very rigid relative support.

Figure 6:
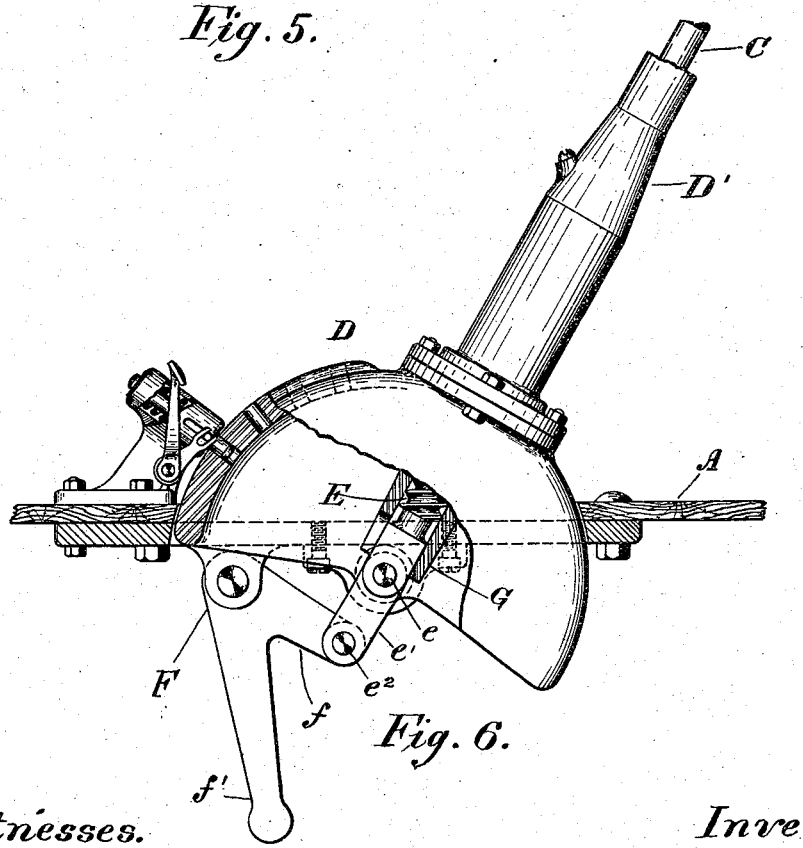

In the drawings, Figure 1 represents in outline a vehicle with my invention embodied, showing its general relation to the interconnected parts. Fig. 2 shows a side elevation of the particular part of the steering mechanism embodying my invention. Fig. 3 shows a section of the lower end of the steering connections and pillar axially longitudinal with the upper end in full elevation. Fig. 4 is a plan view of the lower cap or casing removed from the rest of the bracket, but with the parts immediately associated with it. Figs. 5 and 6 are modified forms of my invention chiefly with respect to supporting means for the pillar or lower end connections, Fig. 5 being a plan view, and Fig. 6 a side view partly broken away.

In the embodiment of the invention illustrated A is a platform or foot-board, which may be any substantial portion of the automobile body or framework.

B is a steering-handle; C, steering shaft or pillar; D, a bracket supporting the steering-pillar; E, the axially-moving member of the pillar or screw, while F is a bell-crank lever to the upper end of which, $f$, is attached a link $e'$, connecting F operatively with E. To the lower arm of F $f'$ is attached a link or bar H, leading to the members J and through them to the steering-wheel K. The lower end of C is recessed and may have a member, such as $c$, set therein, which contains the threads which engage with E. To the lower end of E the link $e'$ is attached by pin $e$ to the axially-moving block, while pin $e^2$ attaches it to $f$, so as to accommodate the movement of the end of $f$, moving in an arc about the axis of F. The axis of $e^2$ is located substantially in the axis of E and C when F is in its normal position, or, in other words, when steering-wheel K is directed straight ahead.

Above the casing D on C are the members integral with it, and at the lower end of C is the member integral with it, $c'$, which is a collar or a stop preventing the longitudinal movement of the steering-pillar relative to its support or casing, while at the same time C is carried in that support in bearings which permit its free rotation. In proximity to the support and, as I prefer, substantially integral therewith are guides G, with which the lower end of E or its pin $e$ coacts to prevent the rotation of E, but permits longitudinal movement. It will be noted that the support or bearings project as a casing at $D'$, covering the screw portions and protecting them from above, at the same time affording a means for permitting the proper lubricating of the working parts—as, for instance, by the oil-hole $d$.

It will be seen that by the movement of hand-wheel B the steering-pillar C is rotated, and by the engagement of the screw $c$ with E the latter is moved longitudinally, as its rotation is prevented by the guides G. This movement moves arm $f$ of the bell-crank F up or down, depending upon the direction of movement of B, and thus moves arm $f'$ back or forth and through the operative connections deflects the steering-wheel K. The resistance to movement of the steering-wheel K reacts through the steering connections to F and finally to the end of the arm $f$ and the pin or pivot point connecting it with E. As this point of reaction or the resistance to the motion of E is substantially in the axis of E, there is no tendency to twist E sidewise—a tendency to jam the threads of E in the engaging threads $c$—while the guides G, guiding the axis of the connections in a plane substantially coinciding with the axis of the pillar, further prevents any tendency of the screw E to, as it might be termed, "tumble" or "jam." The distortions just referred to are what would cause friction or, if not, would cause wear and after a short time make the engaging threads loose. This looseness, resulting in backlash, would make an appreciable movement of hand-wheel B necessary before effecting any movement of the lower steering connections, besides causing a rattling and all the obvious imperfections which are common to many steering connections. It will thus be seen that even with a very short steering-block smoothly operating and non-wearing steering connections can be made if the design is according to my invention, while, vice versa, the block $c$ may be very short and engaged by a long block or screw E.

In Figs. 5 and 6 the bracket D is made heavier and has lateral trunnions, as shown particularly in the dotted lines in Fig. 5, which are supported in bearings in the floor-plate. By this arrangement the plate D can oscillate around the axis of these trunnions, which are arranged so that axis coincides with the normal position of the axis of $e$, the pin connection between the traverse member E, and the link system. Having it pivoted at this point permits the hinging of the entire pillar, with its base and supports—that is, throwing the steering-handle forward or bringing it back into a position convenient to the operator without disturbing the steering-wheels by moving the bell-crank. The bell-crank, as shown in Fig. 6, is supported on the lower side of the plate, which is attached to the floor and which likewise supports the pillar-base D, while the arm $f$ of the bell-crank may be cranked or bent so as to be brought into convenient position in the normal axis of the pillar for attachment to the link connections and traverse member. I do not wish to limit myself to such arrangement, as modifications may be made in the arrangement of bell-crank and other connections to permit the free movement of the base D, the object of any arrangement being, however, to permit the forward extension of that base to be swung downwardly when the pillar is pivoted, so that the latch shown in elevation in Fig. 6 will enter any of the recesses on the ridge on D, so that the base, and thereby the pillar and steering hand-wheel, can be held in any predetermined position. At the same time the construction is such as to permit the easy removal of the base for adjustment or repair, as well as to facilitate its assembling on the vehicle.

Particularly referring to Fig. 2, it will be seen that my construction of operating parts permits the incasing of the steering mechanism in a very compact advantageous manner. The castings or like parts contiguous to the base, or which might be considered to together constitute the base of the pillar, are a continuous casing protecting all the operating or relatively oscillating or screw members from dirt or dust either thrown up from below the vehicle or from above. The construction of this casing in several parts also affords an easy means of assembling the interconnected parts, ready adjustment or machining of the bearings to a perfect fit, and at the same time inclosing all parts which in their operation require protection or lubrication, the only members protruding from the casing being such as transmit motion—as, for instance, the shaft of the bell-crank $f$, to which the oscillating arm or other operating member is attached. The base members of the pillar are, as will be seen particularly in the figures on the first sheet, securely attached to rigid members of the framework of the vehicle, as the angle-iron there indicated, while should the floor portion be made of heavy construction their attachment directly to that is permissible.

It will be readily seen that my invention is susceptible of various forms other than that specifically shown and described, while it may of course be used for any purposes where the conditions of service might demand. Also I do not limit myself to the precise details of construction as the screw or link or form of lever or connection or other parts as shown in my preferred form, as other substantially equivalent means may be used to effect the same results. I do not, however, claim, broadly, any arrangement in a steering mechanism of interengaging threaded parts relatively axially movable, the one rotated by means of a steering-shaft, while the other is held against rotation, in combination with provisions for permitting the forward and backward swinging of the rotating steering-shaft without varying the relative axial position of the interengaging threaded elements.

What I claim as my invention, and desire to cover by Letters Patent, is—

1. The combination of a steering pillar or shaft rotatable about its axis to steer a vehicle, a block or interengaging member movable axially thereof and means for guiding said block or interengaging member and preventing rotation thereof, and steering arm or lever attached to the end of said movable block.

2. The combination of a steering pillar or shaft rotatable about its axis to steer a vehicle, a block or interengaging member movable axially thereof, connections to prevent rotation thereof and steering arm or lever attached to the end of said movable block, said lever moving in an arc, and means connecting said lever and block whereby the end of said lever is permitted to move in an arc slightly diverging from the axis of said block while the block moves directly therein.

3. The combination of a steering pillar or shaft rotatable about its axis to steer a vehicle, a block or interengaging member movable axially thereof, a steering arm or lever attached to the end of said movable block, and means coacting with said block to prevent its rotation, interconnecting mechanism between the pillar and the steering road-wheels of the vehicle magnifying the motion transmitted, whereby a limited movement of the rotating shaft causes a sufficient deflecting movement of the road-wheels as and for the purpose described.

4. In combination with a steering pillar or shaft rotating about its axis to steer a vehicle, an interengaging member movable axially thereof, a steering arm or lever and connections between the latter and the axially-moving member, the axis of said connection substantially intersecting the axis of the rotating shaft the whole mechanism embodied as a unit of apparatus attachable to and detachable from said vehicle without the disconnection of the component parts.

5. The combination in a steering-pillar for a vehicle, of an independent traverse screw-block with flexible connections at one end and coöperating rotating steering-shaft and oscillating steering arm or lever pivoted to a part integral with the support for said steering-shaft pillar for the purpose described.

6. The combination of a steering pillar or shaft rotatable about its axis to steer a vehicle, a block or interengaging member movable axially thereof, a steering arm or lever attached to the end of said movable block, and guides parallel with the axis of the shaft and coacting with said block, whereby the movement of the block is restrained to a purely axial one and the twisting strains prevented.

7. In a motor-vehicle, a steering-pillar, a threaded lower portion substantially integral therewith, a bearing for said pillar including means to prevent longitudinal movement thereof, a threaded screw moving axially within said steering pillar or shaft, link connections between said screw and a steering-lever substantially in the plane of axis of the steering-shaft.

8. In a motor-vehicle, a steering-shaft, bearing or support therefor, an axially-moving member, and coöperating parts on said shaft and member to move the latter axially, a steering arm or lever, connections between said axially-moving member and lever, connections to cause the deflection of the steering-wheels of the vehicle, said support for the steering-pillar mounted to swing about an axis transverse to the shaft and the hinging axis thereof passing substantially through the axis of the shaft.

9. In a motor-vehicle-lever-operating mechanism consisting of a shaft, a recessed end for said shaft internally threaded, means engaging said shaft to prevent longitudinal movement thereof, a threaded block moving axially of said shaft engaging the threaded portion thereof, connections between said axially-moving block and a pivoted lever, said connections lying substantially in the plane of said shaft and block, substantially as shown and described.

10. In a motor-vehicle-lever-operating device including a rotating shaft and an oscillated member, interconnecting mechanism for operating the one by the other comprising threaded or toothed coöperating parts and a casing completely inclosing and supporting the interconnecting mechanism and supporting the same.

11. In steering mechanism for motor-vehicles, a rotating steering-shaft, threaded connections at the lower end thereof, interengaging threaded member connected to oscillate a transverse shaft, a depending arm mounted upon said transverse shaft, a thrust-bearing for said steering-shaft and a bearing for said transverse shaft, a casing completely inclosing said threaded parts and embodying said bearings.

12. In a steering mechanism for motor-vehicles, a rotating steering-shaft and hand-wheel for operating the same, a threaded portion operated by the lower end of said shaft, a transverse shaft and means operated thereby to deflect the steering road-wheels, a casing, said latter shaft projecting through the casing, said casing supporting said shaft and likewise supporting the rotating steering-shaft, the interconnecting operating parts between the lower end of said rotating steering-shaft and transverse shaft being entirely inclosed within said casing.

13. In a steering mechanism for automobiles, an upright rotating shaft, a support at the base of said shaft having bearings for said shaft and bearings for a transverse shaft, said base attached to a rigid portion of the framework or body and including a casing completely inclosing the operating parts, a transverse shaft mounted in said casing, the operating mechanism attached to it within the casing and moved by the rotation of the upright shaft, and having a member attached to it outside of said casing to operate the links and levers to deflect the steering road-wheels.

14. In a steering mechanism for motor-vehicles, an upright rotating shaft, interengaging threaded or toothed parts at the lower end thereof to operate an oscillating member and connections therethrough to the connecting-rod and wheels, the oscillating member, a support or casing for the lower end of said shaft and pivot or hinge connections for said support having an axis substantially intersecting the axis of the rotating shaft.

15. In a steering mechanism for motor-vehicles, a rotating steering-shaft, a support therefor, interengaging threaded or toothed parts operatively connected therewith and pivotal connections with a member oscillating on or with the transverse shaft, said support being hinged or pivoted, the axis of said hinge and the axis of said pivotal connection substantially coinciding in the normal position of the parts, and said common axis substantially intersecting the axis of the rotating steering-shaft.

16. In a steering mechanism for motor-vehicles, a rotating upright shaft above the floor of the vehicle, a depending oscillating arm below the floor of the vehicle, interconnecting means whereby the rotation of the shaft will oscillate the depending lower arm and a casing completely inclosing all the threaded and toothed parts of said interconnections and embodying supporting-bearings for said rotating shaft and for said oscillating member.

17. In a steering mechanism for motor-vehicles, a rotating upright shaft above the floor of the vehicle, a depending oscillating arm below the floor of the vehicle, interconnecting means whereby the rotation of the shaft will oscillate the depending lower arm and a casing completely inclosing all the threaded and toothed parts of said interconnections and embodying supporting-bearings for said rotating shaft and for said oscillating member, and an inlet in said casing for oil above the threaded or toothed parts.

18. In steering mechanism for motor-vehicles, a supporting and inclosing casing including means for attachment to the framework or body of the vehicle, said casing embodying a thrust-bearing and shaft-bearing substantially for the purpose described.

19. In a steering mechanism for motor-vehicles, an upright shaft, mechanism at the lower end of said shaft operatively connecting the same with an oscillating member projecting downwardly, a supporting and inclosing casing for the lower end of said shaft, an inlet to said casing from the upper part whereby the same can be used as and constitute an oil-reservoir substantially as and for the purpose described.

20. In a steering-gear for motor-vehicles including a rotating shaft and its operating hand wheel or lever, a rocking lever or arm and connections to the deflectable road-wheels, intermediate threaded connections for operating the latter by the former, said connections including a tubular casing, an interiorly-close-fitting shell with a threaded portion fixed thereto, and an engaging threaded member within the same whereby said casing, shell, and threaded member coöperate in supporting one another and in transmitting the motion from the hand-wheel to the rocking lever.

21. In a steering-gear for motor-vehicles, a rotating shaft and means at the upper end for operating the same, a rocking lever connected to the deflectable road-wheels, intermediate connections for rocking said lever by the rotation of said shaft, said intermediate connections embodying exteriorly and interiorly coacting threaded parts of length relatively great with relation to their diameter, whereby the same are substantially self-supporting, and a coöperating casing adjacent to the point of engagement of said threaded parts.

22. In a steering-gear for motor-vehicles the combination of a socket, a nut adapted to rotate in the said socket, a screw-pin threaded into said nut, a rocking lever, a coupling between the said lever and the said screw-pin, a casing extended from the said socket and adapted to inclose the said screw-pin and a part of the said rocking lever.

23. In a steering-gear for motor-vehicles, the combination with the body or frame of the vehicle of a socket mounted on said body or frame, a pillar, a nut mounted on said pillar and adapted to rotate in said socket, a screw threaded into said nut, a rocking lever and means for coupling said rocking lever to said screw.

24. In a steering-gear for motor-vehicles, the combination with a rocking lever, a screw and a nut, means for rotating said nut, and a coupling between the screw and one arm of the rocking lever adapted to allow of the straight movement of the said screw and a curved movement of the said arm of the rocking lever.

25. In a steering-gear for motor-vehicles, in combination with a body or frame of the vehicle of a support, a socket or non-rotating pillar mounted on said support extending upward and inclosing substantially the full length of the shaft or operating-pillar, an operating-pillar or shaft including at its lower end a threaded member rotating in the lower end of the socket or stationary pillar, a second threaded member moving within the support or casing and engaging said casing, whereby its rotation is prevented and its movement confined to axial movement upon the rotation of the pillar, a rocking lever and means for coupling said rocking lever to said threaded member.

26. In a steering-gear for motor-vehicles, a shaft or operating-pillar including a threaded member in the lower end thereof, a rocking lever and means for coupling it with said threaded member, a casing comprising three parts, an intermediate section, a lower section parted therefrom substantially at the bearing of the rocking lever and an upper section parted from the intermediate section substantially at the thrust-bearing of the pillar.

27. In a steering-gear for motor-vehicles, the combination of interengaging threaded parts, a rocking lever, operative connections therefor of an inclosing and supporting casing comprising a plurality of sections or parts, said section or portions of the casing parted in a manner whereby ready removal or inspection or repair of the bearings of said mechanism is afforded.

This specification signed and witnessed this 27th day of December, A. D. 1901.

ANDREW L. RIKER.

In presence of—
HERMAN F. CUNTZ,
J. W. GOODRIDGE.